(12) United States Patent
Chan et al.

(10) Patent No.: US 6,697,844 B1
(45) Date of Patent: *Feb. 24, 2004

(54) INTERNET BROWSING USING CACHE-BASED COMPACTION

(75) Inventors: Mun-Choon Chan, Edison, NJ (US); Thomas Y Woo, Red Bank, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 682 days.

This patent is subject to a terminal disclaimer.

(21) Appl. No.: 09/587,445

(22) Filed: Jun. 5, 2000

Related U.S. Application Data

(63) Continuation-in-part of application No. 09/207,196, filed on Dec. 8, 1998.
(60) Provisional application No. 60/145,629, filed on Jul. 26, 1999.

(51) Int. Cl.[7] .............................................. G06F 13/00
(52) U.S. Cl. ........................ 709/206; 709/217; 709/230; 709/246
(58) Field of Search ................................. 709/206, 247, 709/246, 217, 230

(56) References Cited

U.S. PATENT DOCUMENTS

| | | | | |
|---|---|---|---|---|
| 5,781,901 A | * | 7/1998 | Kuzma | 709/206 |
| 5,923,846 A | * | 7/1999 | Gage et al. | 709/213 |
| 5,946,697 A | * | 8/1999 | Shen | 709/218 |
| 5,948,066 A | * | 9/1999 | Whalen et al. | 709/206 |
| 6,178,461 B1 | * | 1/2001 | Chan et al. | 709/247 |
| 6,243,739 B1 | * | 6/2001 | Schwartz et al. | 709/206 |
| 6,539,420 B1 | * | 3/2003 | Fields et al. | 709/206 |

OTHER PUBLICATIONS

M. Crispin. "Internet Message Access Protocol—Version 4." Network Working Group, RFC 1730. Dec. 1994.*
Wills, C; Mikhailov, M. "Examining the Cacheability of User–Requested Web Resource." In Proceeding of the 4th International Web Caching Workshop, Mar./Apr. 1999.*
J. Myers; and M. Rose. "Post Office Protocol—Version 3." Network Working Group, RFC 1939. May 1996.*
U. S. Application for Patent, entitled *"Internet Browsing Using Cache–Based Compaction"* by Moon–Choon Chan and Thomas Y. Woo, filed on Dec. 8, 1998, Ser. No.: 09/207196.

* cited by examiner

*Primary Examiner*—David Wiley
*Assistant Examiner*—Alina Boutah

(57) ABSTRACT

The amount of information associated with an electronic mail message that must be transmitted from an electronic mail server to a client electronic mail application at a user's computer or workstation is reduced using a cache-based compaction technique. This technique enable a requested electronic mail message to be encoded in the server using information relating to similar objects that were previously transferred by the server to the client and that remain available to the server. Differential encoding is performed in the server such that the server transmits to the client information indicative of the differences between the requested object and the reference (similar) objects available in the server cache. A corresponding decoding operation is performed in the client, using the encoded version and reference objects available in the client cache. A similar technique is employed for encoding electronic mail messages in the client that are to be transmitted to the server.

30 Claims, 10 Drawing Sheets

TRANSFER FROM SERVER TO CLIENT

TRANSFER FROM CLIENT TO SERVER

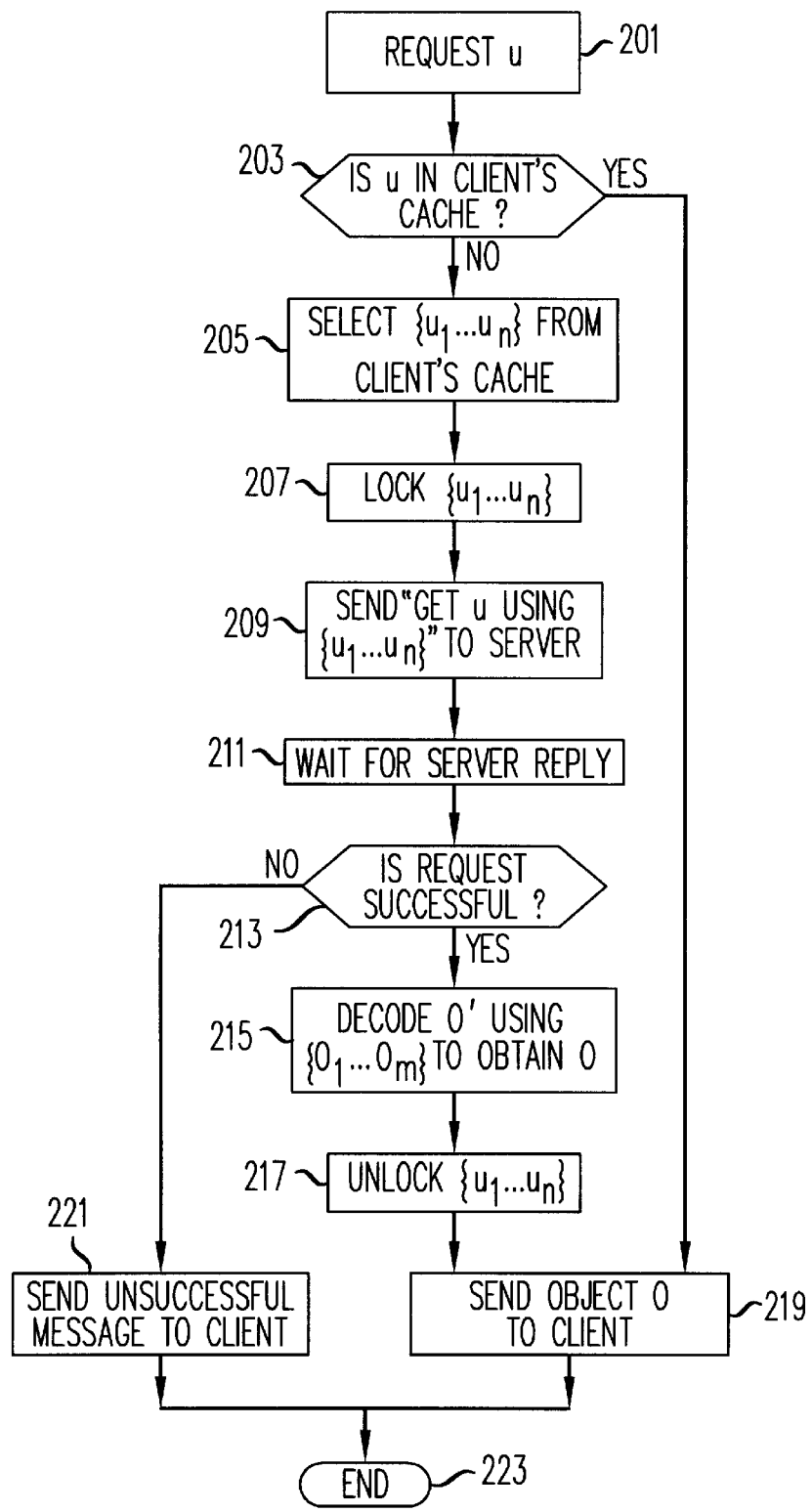

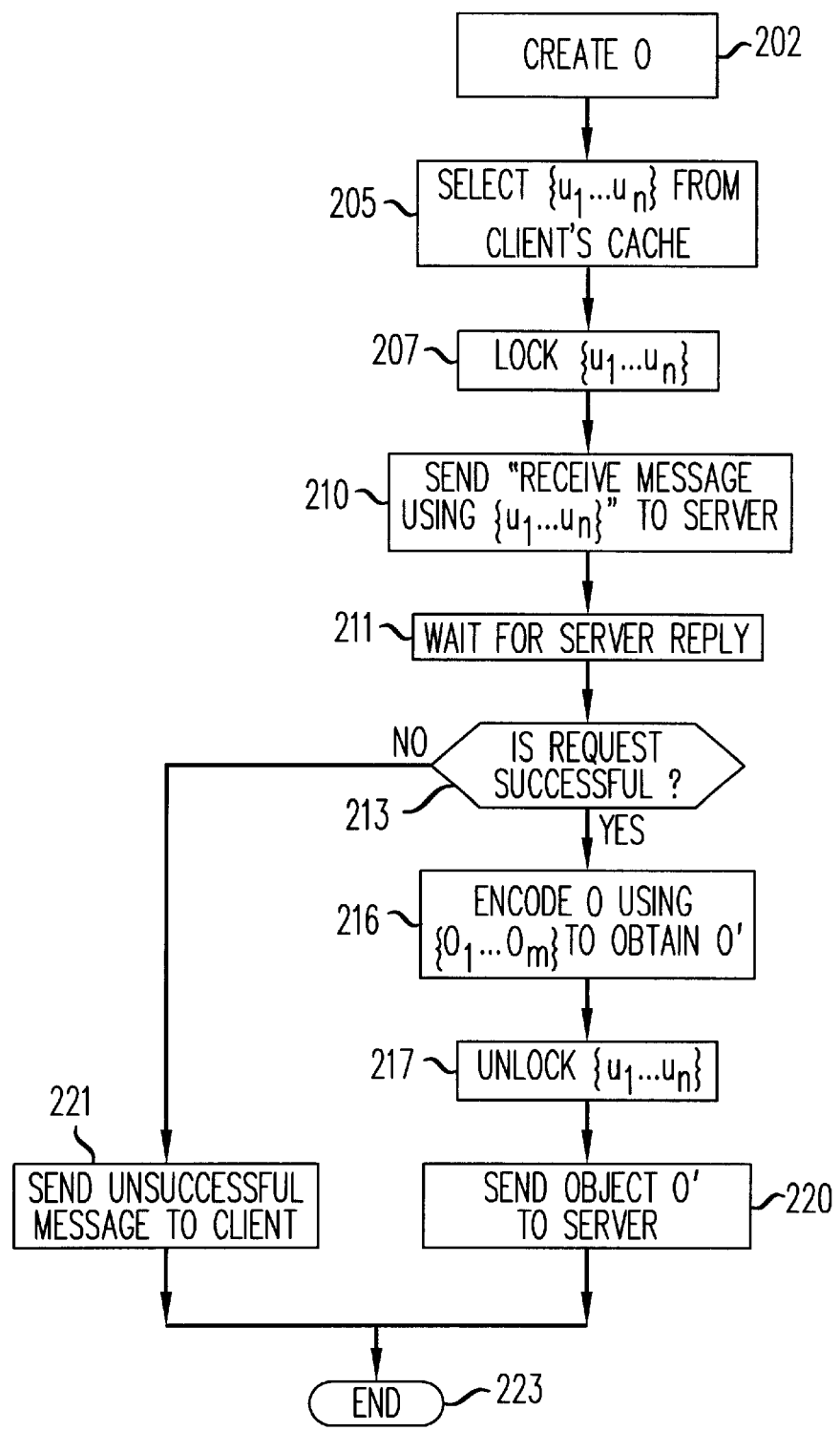

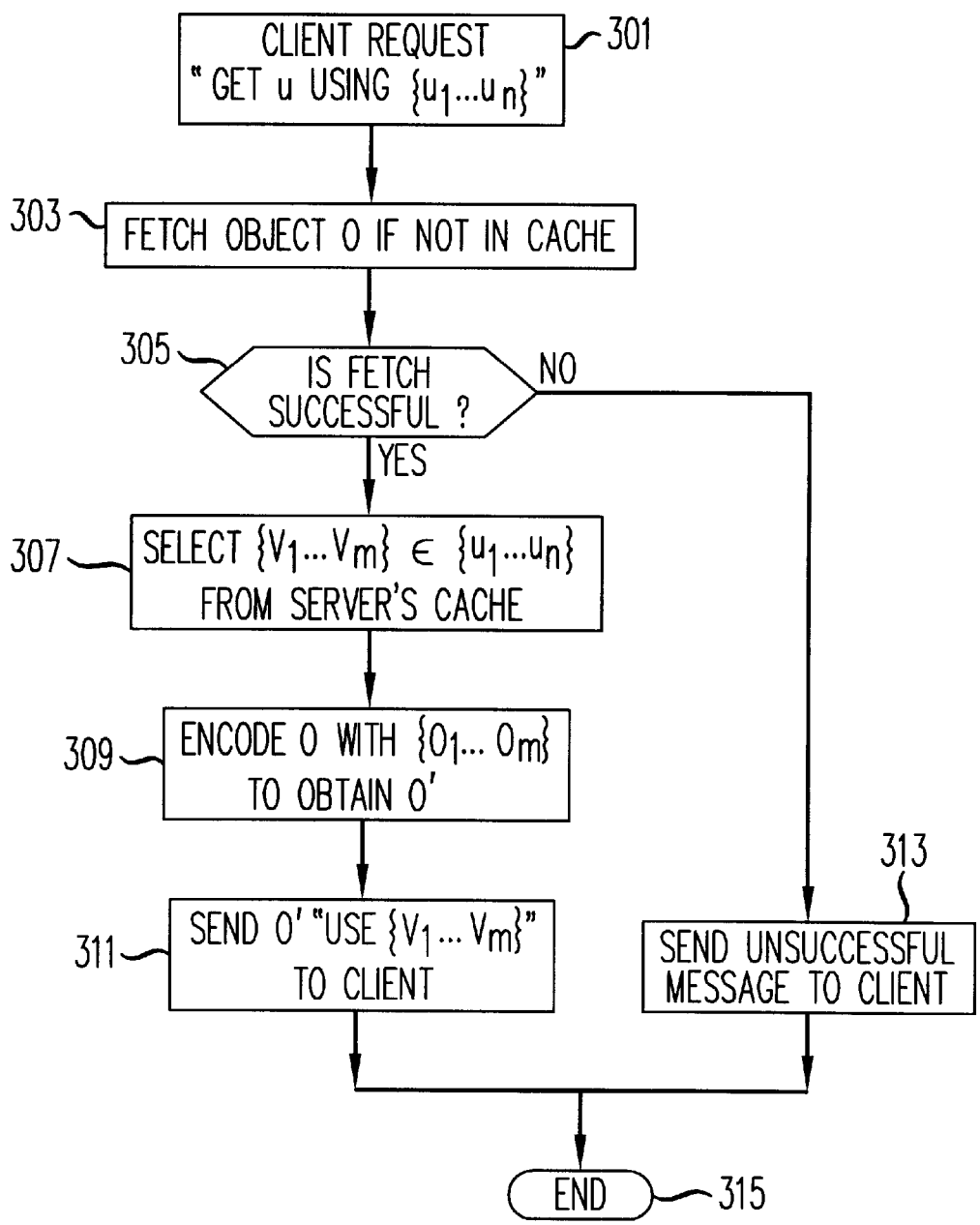

SERVER SIDE PROXY PROCESSING FOR CLIENT TO SERVER TRANSFER

ENCODING

SELECTION

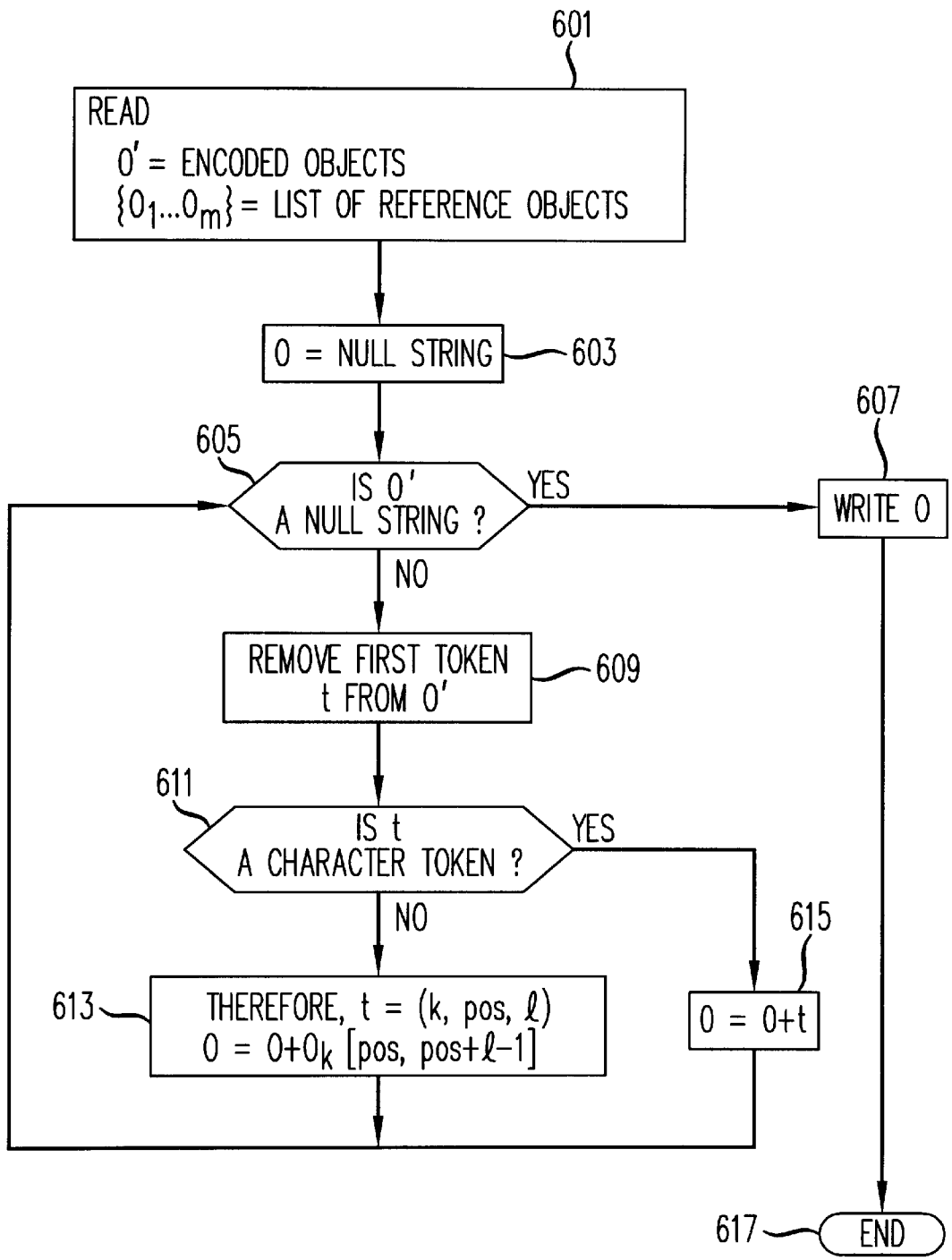

INTERNET BROWSING USING CACHE-BASED COMPACTION

CROSS-REFERENCE TO RELATED APPLICATIONS

This application is a continuation-in-part of the co-pending, commonly assigned, U.S. patent application of Chan et al., entitled "INTERNET BROWSING USING CACHE-BASED COMPACTION," Ser. No. 09/207,196, filed on Dec. 8, 1998, which is hereby incorporated by reference. This continuation-in-part application was provisionally filed by Chan et al. as "CACHE-BASED COMPACTION TECHNIQUE FOR OPTIMIZING WIRELESS EMAIL TRANSFER," Ser. No. 60/145,629, on Jul. 26, 1999.

FIELD OF THE INVENTION

The present invention relates generally to the transfer of information, between an electronic mail server and an associated client application, and more particularly, to a technique that increases the speed at which information may be transferred using cache-based compaction.

BACKGROUND OF THE INVENTION

Despite the phenomenal growth of the Internet, advances in the means and speed of access to the Internet have not kept pace with demand. This is particularly true at the "last hop" between (a) the Internet site to which the user is connected, such as the user's Internet Service Provider (ISP) and (b) the computer or workstation on which the user is running an Internet application. Today, the Internet site/user last hop is still mainly implemented as a connection over a telephone line using a traditional modem, with communication speeds up to only 56 kilobits per second (kbps).

Separately, the use of wireless communications links in the last hop is gaining popularity. Its growth is fueled by the confluence of 3 factors: (1) the development of digital air interface protocols that support data (e.g., CDPD, IS-95, IS-136, GSM/GPRS); (2) the availability of new classes of portable Internet-capable end devices (e.g., Palm Pilot, Handheld PC, Nokia 9000) and wireless modems (e.g., Novatel Wireless); and (3) the falling usage cost for wireless communications. Again, the raw bandwidth available on most wireless channels is low (e.g., 19.2 kbps for CDPD), which can be further impaired by their multiple-access contention nature and protocol overhead. For example, the effective application layer throughput of CDPD is about 8 kbps without contention.

In a nutshell, Internet traffic behind slow wireline access links will likely persist for years to come. Wireless Internet access, which is emerging only now, will present an even more severe problem.

A number of previous approaches have been suggested in order to reduce the delay incurred in the last hop. Most of these approaches involve increased usage of storage or computation to make up for limitations in the communication medium. This typically amounts to a trade-off, since storage and computational complexity each add overhead and cost to the system. The key to the success of any of these processing techniques is that the increase in processing delay should be more than offset by the decrease in transport delay, thus resulting in a decrease in the overall latency.

One technique, known as "caching", stores earlier responses, and reuses them to satisfy a repeated request. For example, an electronic mail server might cache both the set of received electronic mail messages and a list of mail destinations repeatedly used by a user for sending mail. Another technique, known as "prefetching", tries to predict, fetch and store information before it is needed. For example, an electronic mail client might selectively prefetch information describing newly received electronic mail messages (such as the sender's name, date, message length and subject).

Compression can be achieved by the use of differential transfer to transmit only changes between current and past information. Some of the differencing algorithms used are UNIX diff and vdelta, as described by J. Hunt, K. P. Vo, and W. Tichy, "An Empirical Study of Delta Algorithm", IEEE Software Config. and Maint. Workshop, March 1996; and J. Hunt, K. P. Vo, and W. Tichy, "An Empirical Study of Delta Algorithms", IEEE Software Config. and Maint. Workshop, March 1996. The benefits of delta coding were also studied by Jeffery C. Mogul, Fred Douglis, Anja Feldmann, and Balachander Krishnamurthy, "Potential Benefits of Delta Encoding and Data Compression for Http", Proceedings of the ACM SIGCOMM, pages 181–194,1997.

The amount of latency reduction obtainable from caching and prefetching components of electronic mail messages is limited. Accordingly, there is a significant need for an improved latency reduction technique.

SUMMARY OF THE INVENTION

In accordance with the present invention, the amount of information that must be transmitted, for example, between an electronic mail server and a client is advantageously reduced using a cache-based compaction technique in which the requested object is encoded in the server using information relating to similar objects that were previously supplied to the client by the mail server.

More specifically, when the client requests an object, and that object is not already in the client's local cache, similar objects in the local cache are identified, and a request is sent to the server to retrieve the desired object using a set of stored "reference" objects that are identified in the request and are similar to the requested object. Instead of sending the actual object from the server to the client, the object is encoded using some or all of reference objects that are available in both the server and the client cache. The more similar the reference objects are to the requested object, and the more such similar reference objects are available to the server and the client, the smaller is the resulting transfer. The encoded information received by the client is then decoded in conjunction with the set of reference objects previously identified in the local cache, and the decoded information is provided to a user application in the client.

In accordance with one aspect of the present invention, the selection of reference objects is based upon the notion that objects that are similar in content tend to have similar descriptors (for example, electronic mail descriptors such as sender name, date, message length and subject). Less computational effort is required to determine similarity among descriptors than to determine similarity among complete objects.

Descriptors may be chosen according to object type (for example, electronic mail message header or body). By selecting one or more reference objects with similar descriptors for encoding the requested object, the probability of finding similar content in the set of reference objects increases, leading to a smaller encoded reference object.

In accordance with another aspect of the present invention, the encoding process uses a universal data compression algorithm that isolates data strings in each reference object that are held in common with the requested object. Common strings are encoded in a very concise way by encoding only the locations and sizes of the common strings in the reference objects. As a result, the encoded object is significantly smaller than the original object. After the encoded object is transmitted, decoding of the encoded object is enabled by reference to the reference objects.

In accordance with yet another aspect of the present invention, the cache-based compaction technique is applied to the transmission of an electronic mail message from the client to the mail server.

BRIEF DESCRIPTION OF THE DRAWING

The present invention will be more fully appreciated by consideration of the following detailed description, which should be read in light of the accompanying drawing in which:

FIGS. 2A and 2B respectively illustrate in greater detail the client side processes associated with FIGS. 1A and 1B;

FIGS. 3A and 3B respectively illustrate in greater detail the server side processes associated with FIGS. 1A and 1B;

FIG. 6 is a diagram illustrating the decoding process performed in step 215 of FIG. 3A and 2B.

DETAILED DESCRIPTION

The cache-based compaction technique embodied in the present invention reduces the size (and the latency) of electronic mail last hop transfers using two principal components: (1) a selection process for choosing reference objects, and (2) encoding/decoding processes that encode and decode a new object using a collection of cached reference objects. In order to obtain an overview of the cache based compaction technique used in the present invention, reference is made first to FIG. 1A, which illustrates graphically some of the principal processes performed in accordance with the present invention.

Figure 1A:
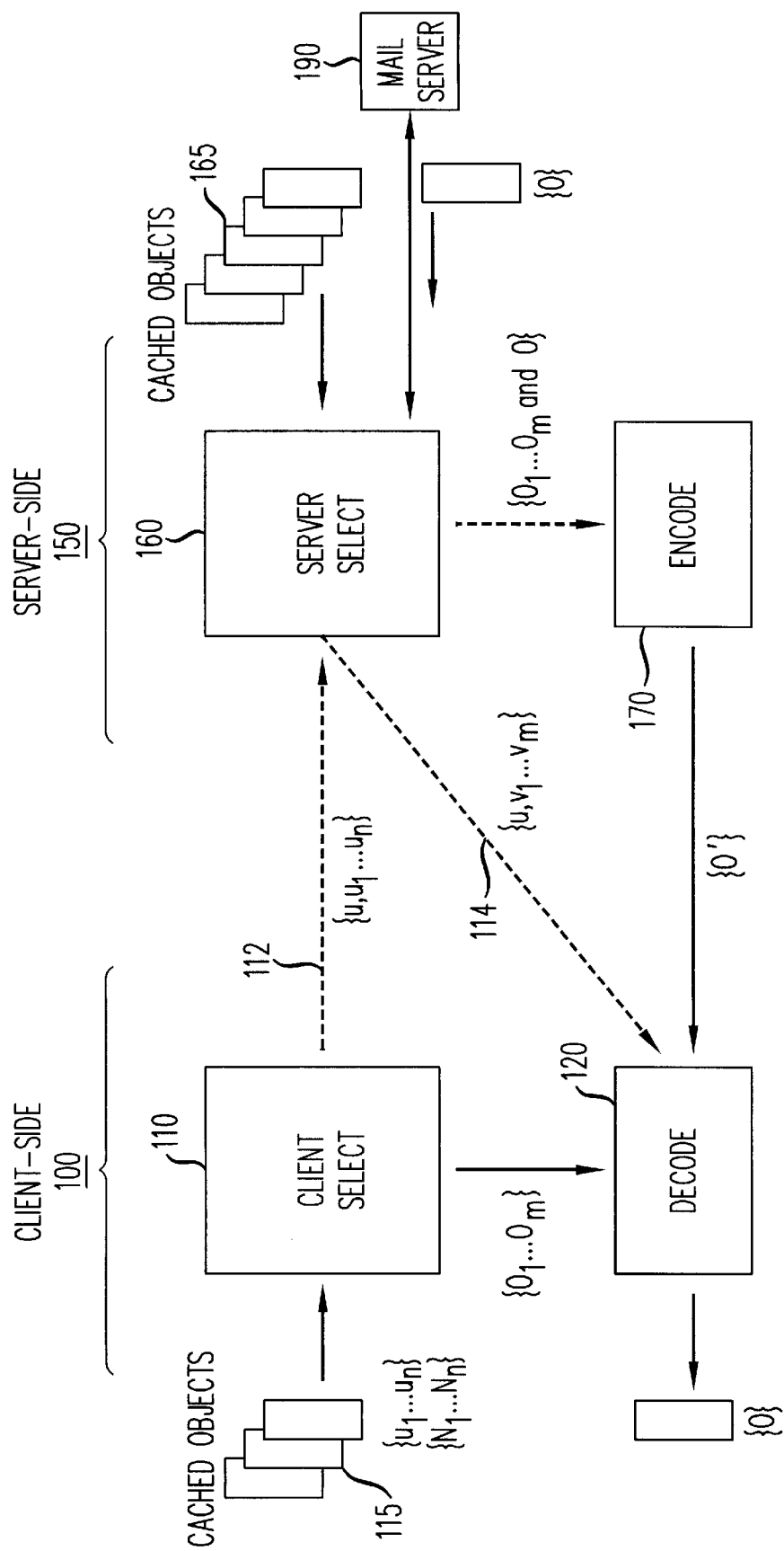
FIGS. 1A and 1B illustrate the inventive processes performed for client retrieval of electronic mail messages.

FIG. 1A illustrates client side and server side processes used in the requested transfer of an electronic mail message from a mail server to a mail client. Generally, the processes of FIG. 1A are performed either on the client side 100, for example, in the computer of an electronic mail application "user," or on the server side 150, in a mail server to which the user is connected. The mail server, for example, may be a mail server that serves a group of users within a domain and caches objects that have been accessed by these users. The client side processes of FIG. 1A are invoked when a user, operating a client mail application, such as MICROSOFT's Exchange or QUALCOMM's EUDORA, desires to retrieve a particular mail message.

When a user at client side 100 issues a select request identifying a desired electronic mail message object O by an identifier u, a client select process 110 is invoked. (this process is described more fully in connection with FIG. 2A below). The identifier u will typically be a unique integer generated by an electronic mail server upon receipt of the message (for example, the unique identifier or UID specified by the IMAP4 protocol). A user may request that the message be retrieved with or without associated binary files transmitted with the message (commonly referred to as "attachments"). Alternatively, a user may request that the message be retrieved in a summary form (for example, including information about the sender, other recipients, subject or title, and date and time of delivery).

If it is determined that the requested object O is not already stored, for example, in the local client cache in the user's computer, the identifiers $\{u_1 \ldots u_n\}$ of a set of cached objects $\{N_1 \ldots N_n\}$ 115 that are similar to the requested object are identified. The identities of these objects $\{u_1 \ldots u_n\}$ and the identity of the requested object (u) are then communicated to the server side 150 by a control signal, indicated by the dashed line 112 of FIG. 1A.

The objects identified as $\{u_1 \ldots u_n\}$ must be "pinned down" by the client and the mail server as long as they are referenced in an outstanding request. This prevents their flushing until the response is received. Obviously, they should also be "unpinned" if the request is completed or terminated abnormally.

The identifiers $\{u_1 \ldots u_n\}$ are used to invoke a server select process 160 that obtains the same cached objects $\{N_1 \ldots N_n\}$ 165 from a message store or a server cache, and applies the objects, which are used as "reference objects", to an encode process 170. In general, zero or more of the $\{N_1 \ldots N_n\}$ objects can be found in the server cache. Let the number of referenced objects found be $\{O_1 \ldots O_m\}$ with identifiers $\{v_1 \ldots v_m\}$, where m is less than or equal to n. Concurrently, the server looks for the object with identifier u in its cache. If the object is not in its cache, a request for the object with identifier u is transmitted through the Internet to mail server 190. The mail server 190 will typically retrieve the object O with identifier u from one of one or more message stores linked to the mail server 190. The object O is returned to the server for use in encode process 170 together with cached objects $\{O_1 \ldots O_m\}$.

Figure 4:
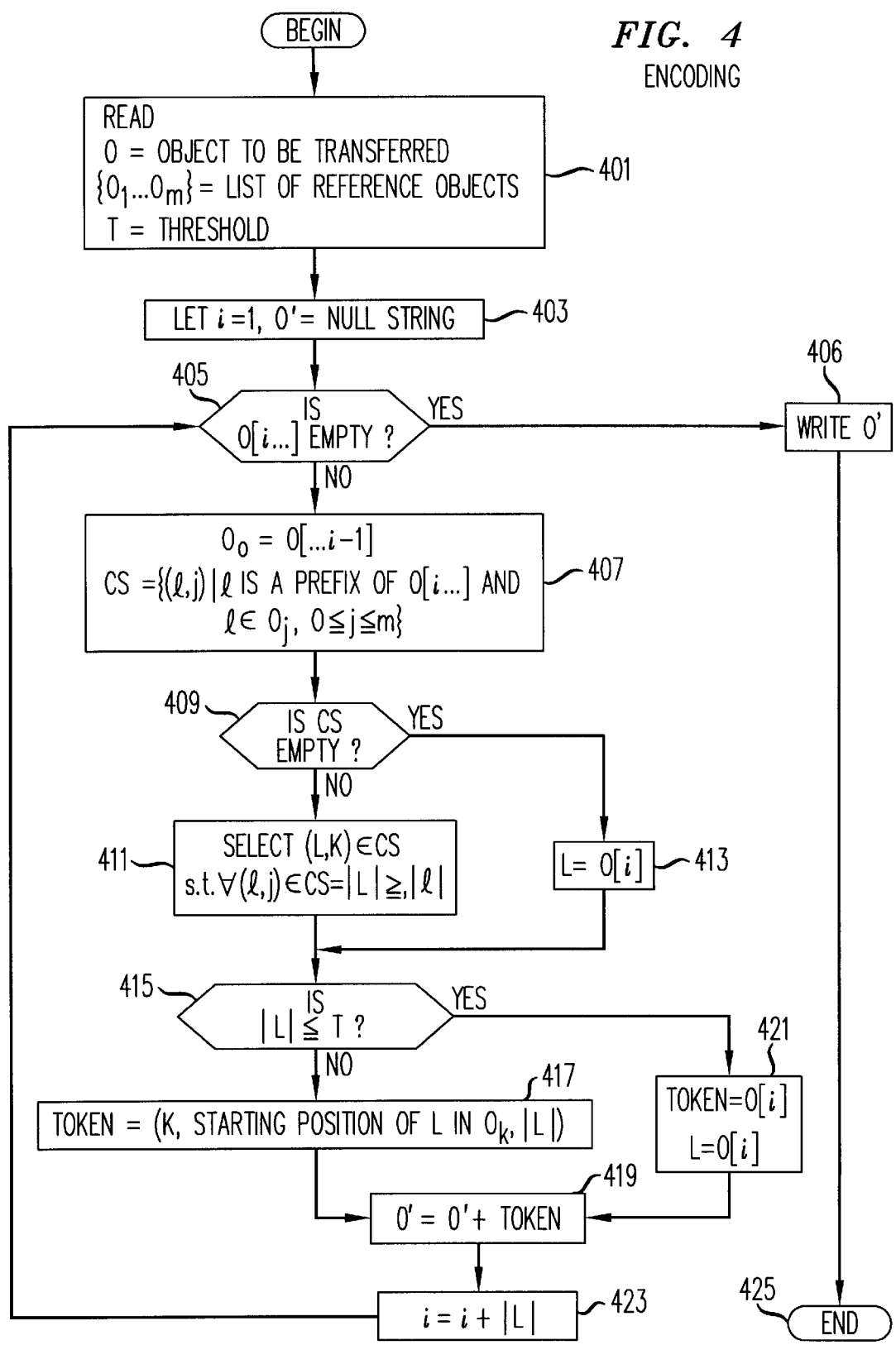
FIG. 4 is a diagram illustrating the encoding process performed in FIGS. 2A and 3B.

Encode process 170, which is described in more detail below in conjunction with FIG. 4, is arranged to form an encoded compressed version O' of the requested object using the reference objects as a code dictionary. In this way, the output (O') of encode process 170 represents the requested object, but in a much more compact and efficient form. The encoded compressed version is transmitted back to the client side 100, for use in a decode process 120, which receives the reference objects $\{O_1 \ldots O_m\}$ from the client select process 110. Decode process 120, which is described in more detail below in conjunction with FIG. 6, uses the reference objects $\{O_1 \ldots O_m\}$ together with the encoded compressed version to generate the desired object O, which is passed to the user's client mail application. As a practical optimization, the mail server side 150 should send O' instead of O only if their size difference exceeds a certain threshold. The value of the threshold should partially depend on the link speed between the client side 100 and the server side 150.

Figure 1B:
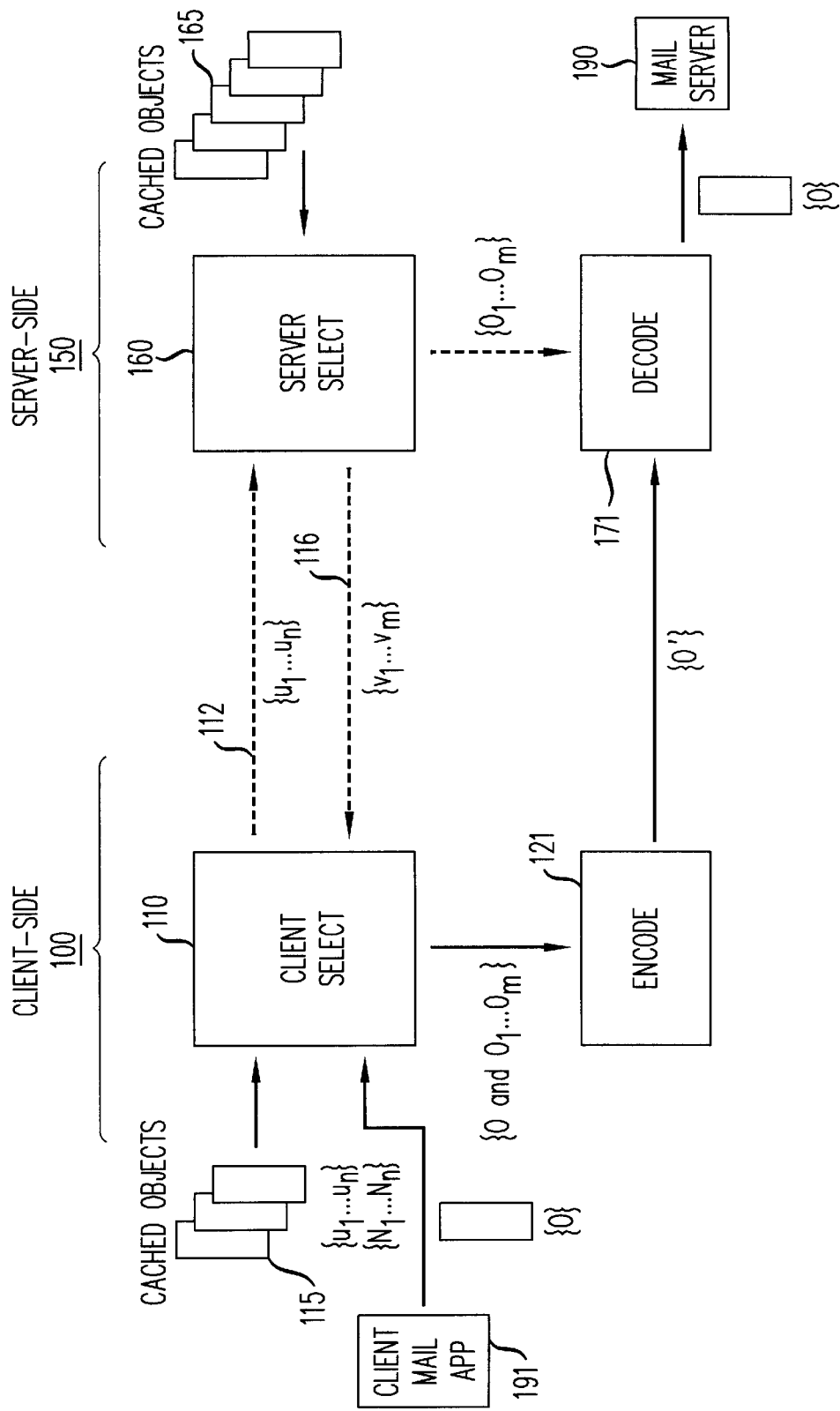

FIG. 1B illustrates a similar set of processes used in the transfer of an electronic mail message from a mail client to a mail server. These differ from the processes described with reference to FIG. 1A in the following manner. The processes illustrated by FIG. 1B begin with client mail application 191 creating a message object O, and identifying the identifiers $\{u_1 \ldots u_n\}$ of a set of cached objects $\{N_1 \ldots N_n\}$ 115 that are similar to the composed message. The identified objects serve as candidate reference objects. The identifiers $\{u_1 \ldots u_n\}$ of these candidate reference objects are then communicated to the server side 150 by a control signal, indicated by the dashed line 112 of FIG. 1B.

The identifiers $\{u_1 \ldots u_n\}$ are used by server select process 160 to identify cached objects 165 identical to the candidate reference objects identified by identifiers $\{u_1 \ldots u_n\}$. The selection process is described below in more detail with reference to FIG. 5. In general, zero or more of the candidate reference objects will be found among cached objects 165. Let the number of referenced objects found be $\{O_1 \ldots O_m\}$ with identifiers $\{v_1 \ldots v_m\}$, where m is less than or equal to n. Server select process 160 embeds the identifiers $\{v_1 \ldots v_m\}$ in a "HAVE" header, and then communicates this information to client select process 110 by means of control signal 116.

Significantly, control signals 112 and 116 may be omitted if the mail server stores all messages cached by the client. This advantageously reduces signaling overhead in the electronic mail message transfer.

Client select process 110 uses identifiers $\{v_1 \ldots v_m\}$ to select cached reference objects $\{O_1 \ldots O_m\}$, and provides message O 191 and reference objects $\{O_1 \ldots O_m\}$ to encode process 121, which produces encoded compressed version O'. Encode process 121 is described in more detail below in conjunction with FIG. 4. Decode process 171, which is described below in more detail in conjunction with FIG. 6, receives encoded compressed version O' from client side 100 and reference objects $\{O_1 \ldots O_m\}$ from server select function 160 to decode message O at server side 150. Once decoded, message O is ready to be stored or transferred by mail server 190.

From the foregoing description, it is seen that a convenient way to implement the compaction technique of the present invention without modifying the client or the server is to employ proxying. Specifically, we interpose two cooperating proxies, one on the client side and the other on the server side, between the actual client and server. Note that the server (or the client for that matter) can itself be a proxy cache server. In the latter case, the compaction feature can be integrated with the proxy caching feature.

Conceptually, if complete knowledge of caching policy is known, then either the client proxy or the server proxy can choose the reference objects. In practice, however, such knowledge may not be synchronized. In such cases, a distributed implementation of the selection algorithm is used. For example, the client proxy first selects the reference objects identified as $\{u_1 \ldots u_n\}$. This information is communicated to the server proxy as part of the request in a new header "HAVE," illustrated for example in FIG. 1A by the dotted line labeled 112.

Upon receiving the request, the server proxy uses the set of objects listed in the "HAVE" header as the basis to determines a subset, identified as $\{v_1 \ldots v_m\}$, which will actually be used for encoding. The specific subset chosen is communicated back to the client proxy as part of the response in a new header "USE." This is illustrated, for example, by the dotted line labeled 114 for the server-to-client-oriented process of FIG. 1A. A similar approach is used for the client-to-server-oriented process illustrated in FIG. 1B.

Although the selection process could begin with either proxy, the process is best suited to begin with the client proxy. The client cache is typically smaller than the server proxy, and may not contain a number of the objects cached in the server cache. As a result, a selection process beginning with the server proxy would likely produce the undesirable result of selecting a number of reference objects in the server cache by the server proxy that are unavailable in the client cache.

While the present invention is, at a high level, an extension of the universal compression algorithm described by Jacob Ziv and Abraham Lempel in "A Universal Algorithm for Sequential Data Compression", IEEE Transaction on Information Theory, IT-23(3), 333–343, May 1977, the present technique differs in that it looks for similar content from a selected set of reference objects, in addition to the object itself. Furthermore, while the present invention can be viewed generally as a differential transfer technique in that it compresses out the similar parts, and transfers mainly the differences, it is unlike existing differential transfer techniques, because the measure of "similarity" that is used is not restricted to just objects from earlier versions. Rather, with the present approach, multiple objects in the client's cache from a variety of sources can potentially be used.

Referring now to FIG. 2A, there is shown a diagram illustrating in more detail the client side process of FIG. 1A for server to client message transfers. Processing begins in step 201 when a request for an object O with name u is sent to the client-side proxy processor. This request may be generated, for example, when a user clicks on a "new" electronic mail message indicator provided by a client mail application. In step 203, the client proxy checks to see if the object O is in its local cache. If object O is in the cache, a "yes" result is obtained in step 203, and the requested object O is returned to the client in step 219. The object is then displayed in the user's client mail application. Processing then ends in step 219. This operation is similar to present day caching, since the identical object to the one sought by the user was already available locally, and there was no need to fetch the object from a remote server.

If the requested object was not available in the local cache, and the result in step 203 was "no", a selection process, described in more detail below in conjunction with FIG. 4, is used in step 205 to select n reference objects which are similar to the requested object and are present in the proxy client's cache. These reference objects identified as $\{u_1 \ldots u_n\}$, are then locked in the local cache in step 207 to ensure that they will be present when the server replies. The request consisting of the requested object identifier u and the reference object identifiers $\{u_1 \ldots u_n\}$ are then sent to the proxy server in step 209. The client then waits, in step 211, for the server to reply.

In accordance with the present invention, the server is arranged to reply (in step 305 of FIG. 3A, discussed below) with either a successful or an unsuccessful message, and this reply is processed in step 213. If the reply is unsuccessful, a "no" result occurs in step 213, and an unsuccessful message is sent to the client in step 221. The process then ends in step 223. Exception handling is performed by the client. If the reply is successful, a "yes" result occurs in step 213, and the reply from the server contains O', the encoded version of object O, plus the identifiers $\{v_1 \ldots v_m\}$ for the reference objects $\{O_1 \ldots O_m\}$ that the proxy server used to encode the object O. The identifiers $\{v_1 \ldots v_m\}$ are a subset of $\{u_1 \ldots u_n\}$. In step 215, a decoding process, described in more detail below in conjunction with FIG. 6, is applied to the encoded object O' using the identifiers $\{v_1 \ldots v_m\}$ and objects $\{O_1 \ldots O_m\}$. The object O thus obtained is sent to the client in step 219, after the list of reference objects with names $\{u_1 \ldots u_n\}$ is unlocked in step 217. The process then ends in step 223.

As illustrated in FIG. 2B, the client side (proxy) process of FIG. 1B for client to server message transfers is somewhat similar to the process illustrated in FIG. 2A. Processing begins in step 202 with the creation of object O by the client mail application. Once O is created, a selection process as described below in conjunction with FIG. 4 is used in step 205 to select n reference objects in the client's cache which are similar to the object O. The n reference objects are locked in step 207 to ensure that each will be present when the server replies to a "Receive Message (O)" message sent by the client to the server in step 210.

If the reply is unsuccessful, a "no" result occurs in step 213, and an unsuccessful message is sent to the client in step 221. The process then ends in step 223. If the reply is successful, a "yes" result occurs in step 213, and the reply from the server includes the identifiers $\{v_1 \ldots v_m\}$ for reference objects $\{O_1 \ldots O_m\}$ that the proxy server will use to decode the object O. The identifiers $\{v_1 \ldots v_m\}$ are a subset of $\{u_1 \ldots u_n\}$. It should be noted that, if the server cache is substantially larger than the client cache, it may be reasonably assumed that all messages in the client cache are also present in the serve cache. Under this assumption, steps 210 through 213 may be omitted from the process of FIG. 2B, as there is no need to synchronize the client and server caches.

In step 216, object O is encoded using reference objects $\{O_1 \ldots O_m\}$ to produce encoded object O'. Encoded object O' is sent to the server in step 220, after the list of reference objects with identifiers $\{u_1 \ldots u_n\}$ is unlocked in step 217. Alternatively, steps 210 through 213 may be omitted, and the list of reference objects with identifiers $\{u_1 \ldots u_n\}$ may be sent with encoded object (O') to the server in step 220. The process then ends in step 223.

Referring now to FIG. 3A, there is shown a diagram illustrating in more detail the server side proxy process of FIG. 1A for server to client message transfers. This process complements the client side proxy process described with reference to FIG. 2A.

Processing starts in step 301 when a request for object O with identifier u is received by the proxy server. The request will also specify that O should be encoded with the list of reference objects with identifiers $\{u_1 \ldots u_n\}$. If object O is not present in the proxy server's cache, it is fetched in step 303 from one of the message stores associated with the mail server application. If the fetch is determined to be unsuccessful in step 305, a "no" result is obtained, an unsuccessful message is sent to the proxy client in step 313, and the process terminates in step 315. Exception handling is performed by the mail server application.

If the fetch is successful and a "yes" result is obtained in step 305, a subset $\{O_1 \ldots O_m\}$ of the objects $\{N_1 \ldots N_n\}$ with identifiers $\{v_1 \ldots v_m\}$ present in the server's cache are selected in step 307 and used as reference objects for the purpose of encoding the desired object O in step 309. The selection process used to determine the appropriate subset of objects is explained below, in connection with FIG. 5, and the encoding process is explained in connection with FIG. 4. The encoded object O' along with the identifiers $\{v_1 \ldots v_m\}$ for reference objects $\{O_1 \ldots O_m\}$ used during the encoding process are sent to the proxy client in step 311, whereupon the process is ended in step 315.

Figure 3B:
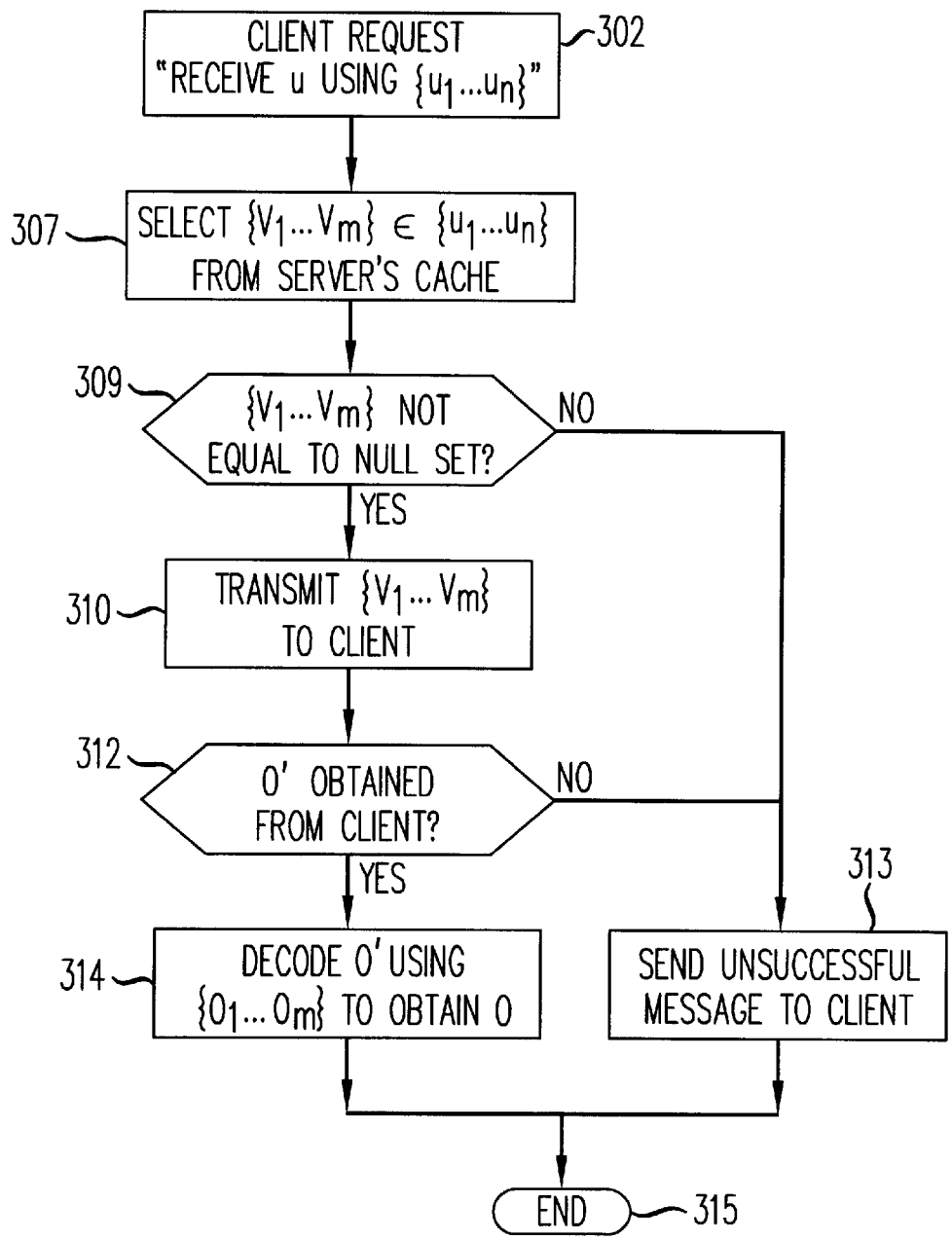

Similarly, the server side proxy process of FIG. 1B for client to server message transfers is illustrated in FIG. 3B. This process complements the client side proxy process described with reference to FIG. 2B. Processing starts in step 302 with receipt of a client request for the server to receive a client-encoded message to be decoded using reference objects $\{N_1 \ldots N_n\}$ with identifiers $\{u_1 \ldots u_n\}$. In step 307, the server process selects objects $\{O_1 \ldots O_m\}$ with identifiers $\{v_1 \ldots v_m\}$ matching at least some of elements $\{u_1 \ldots u_n\}$. Reference objects $\{O_1 \ldots O_m\}$ are present in the server's cache. If the selection is unsuccessful (i.e., results in the null set), an "unsuccessful" message is sent to the client proxy in step 313, and the process terminates in step 315. If the selection is successful, the process proceeds from step 308 to transmit identifiers $\{v_1 \ldots v_m\}$ to the client in step 310, indicating to the client that reference objects $\{O_1 \ldots O_m\}$ should be used by the client to encode O'. Once O' is obtained from the client, the server proxy proceeds in step 314 to decode O' using $\{O_1 \ldots O_m\}$ to obtain client message O. Once decoded, client message O can be processed as required by the server proxy.

Referring now to FIG. 4, there is shown a diagram illustrating the encoding process performed, for example, in step 309 of FIG. 3A. As stated previously, the encoding process is used to encode the object O using a list of m reference objects, $\{O_1 \ldots O_m\}$, such that the encoded version O' of object O is smaller than O. The underlying strategy for the encoding process is that a dictionary-based compression scheme (the most well known being the scheme described by Jacob Ziv and Abraham Lempel, "A Universal Algorithm for Sequential Data Compression", IEEE Transaction of Information Theory, IT-23(3):337–343, May 1977. See also Jacob Ziv and Abraham Lempel, "Compression of Individual Sequences via Variable-rate Coding", IEEE Transaction of Information Theory, IT-24(3) :530–536, September 1977 family) works because of the recurrence of common sub-strings within a document. In other words, one part of the document is similar to another part of itself. Furthermore, we also exploit the notion of similarity among multiple documents for reducing transfer. If a number of similar documents are already transferred from the mail server to the client, transfer of the next similar document can be done in a more efficient manner. An object O is essentially viewed as a byte array, with O[i] denoting the i-th byte of O (we start counting from 1), O[. . . i] denoting the part of O from the beginning up to and including the i-th byte, and O[i . . .] denoting the part of O beginning at i-th byte of O to the end. The measure of similarity for encoding purposes is the number and length of common substrings. The longest substring that begins at a current pointer of object O and that is present in O (up to and excluding the current pointer) or $\{O_1 \ldots O_m\}$ is selected. If the longest substring is a null string or if the length of the substring is less than or equal to a threshold value, the character indicated by the current pointer is appended to O' and the current pointer is moved forward by the distance represented by the character substring. Otherwise, a triple {index of reference object, starting position of common substring in reference object, and length of substring} is appended to O' and the current pointer in O is moved forward by the length of the substring. If the current pointer is not pointing at the end of the object O, the procedure is repeated. Otherwise, O' is obtained.

Referring specifically to FIG. 4, a threshold parameter T is defined to make sure that O' is indeed smaller than or equal to O. This is achieved by setting T to be larger or equal to the overhead of encoding the triple. Each of the required parameters, namely O, $\{O_1 \ldots O_m\}$, and T, are read in step 401. Also, in step 403, O' is initialized to a null string and the current pointer is set (i=1) to the beginning of the object O. Note that, as described throughout this description and in particular with reference to FIG. 4, the first character in the object O is designated as $O_1$ rather than $O_0$.

In step 405, a determination is made as to whether O[i . . .] is empty, indicating that the entire object has been processed. If so, a "yes" result is obtained in step 405, the value of O' is written (or output) in step 406, and the process terminated in step 425. If not, a "no" result in obtained in step 405, and the process proceeds to step 407. In steps 407 through 423, there is a search for the longest common substring between the part of O currently being processed and either the part of O that has been processed ($O_O$ specifically) or one of the m reference objects $\{O_1 \ldots O_m\}$. More particularly, in step 407, all prefixes of O[i . . .] that are present in the reference objects are put into the set CS. Here, prefixes represent substrings in O[i . . .] that begin at $O_i$.

Step 409 checks if CS is empty. If CS is empty, no common substring is found and the string L is set to be the character indicated by the current pointer in step 413. If CS is not empty, step 411 sets L to be the longest substring in CS. In case of a tie, one substring may be selected from among the tied substrings (for example, the substring having the smallest index m may be selected). Step 415 checks to determine if the length of L is greater than T or not. If this is true, step 417 is performed and the triple is encoded as a token. Otherwise, step 421 is performed and the first character indicated by the current pointer is selected as the token and as the string L. The token is appended to O' in step 419 and the current pointer i is advanced by the length of L in step 423.

It should be clear that the encoding process described above is lossless. Though it works for any objects, it is most applicable to text (e.g., plain ascii, HTML) objects. For graphical objects that are already in compressed form (e.g., GIF, JPEG), the amount of non-trivial similarity among objects is minimal. In particular, even pictures that are "visually" similar do not share significant similarity in their coded forms. Besides, the size of a graphical object is directly proportional to its quality. Advanced compression techniques exist that can drastically reduce the size of a graphical object while retaining most of its "visible" quality. Thus, for present purposes, we use compaction on text objects only.

Turning now to consideration of the selection process by which the objects $\{O_1 \ldots O_n\}$ are determined, we begin with the recognition that for a good compression result, the selection algorithm needs to be able to pick a set of reference objects that are similar to the requested object. While examining the content of the objects is the only sure way of deciding if they are similar, this process is too computationally expensive, especially when the collection of objects is large (e.g., all the objects in a cache). Therefore, the present invention must use heuristics based on other attributes of the objects.

Figure 5:
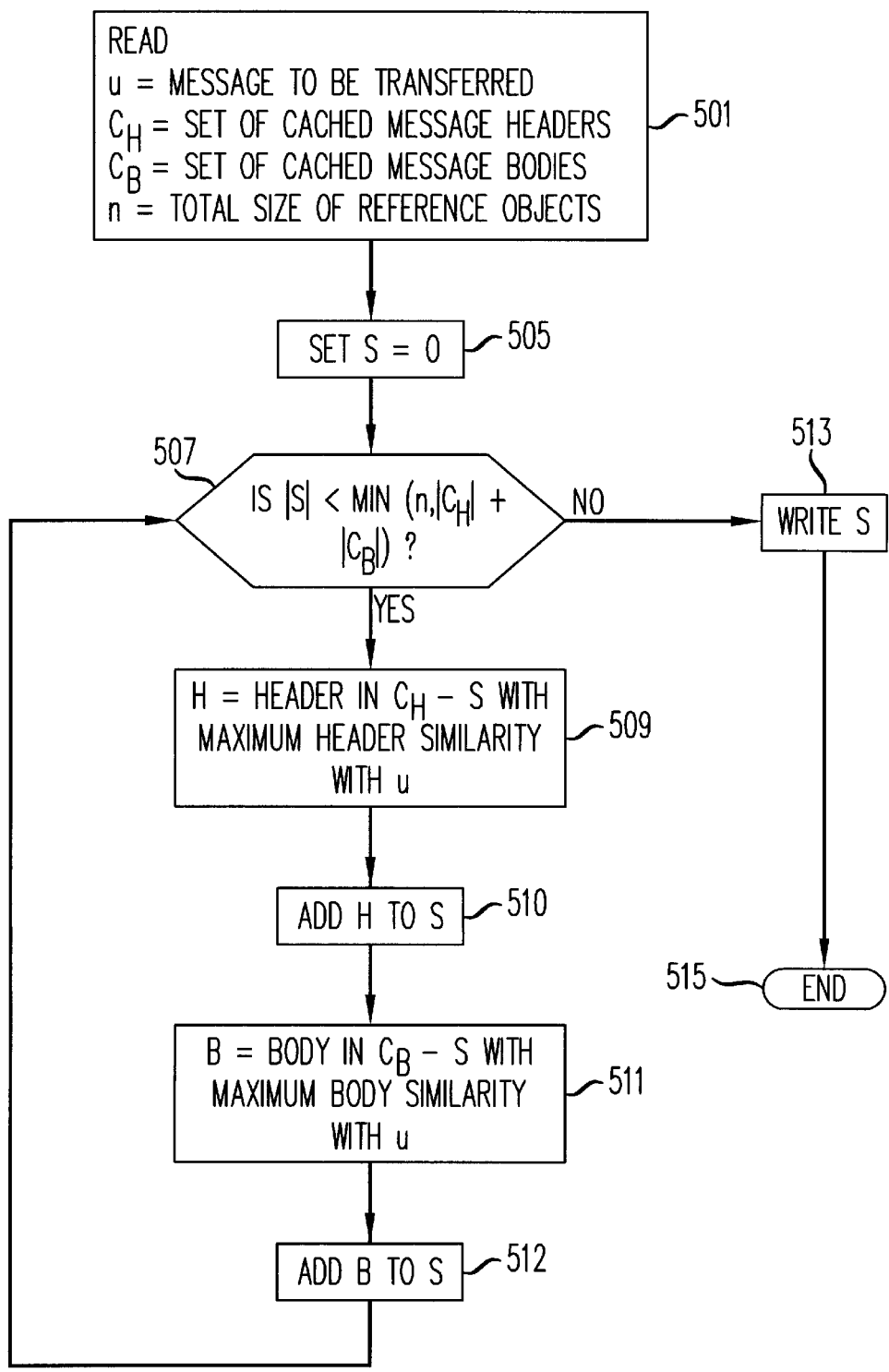
FIG. 5 is a diagram illustrating the selection process performed in FIGS. 2A and 3B.

FIG. 5 provides a flowchart illustrating a process for heuristically selecting reference objects for encoding a message O to be transferred either by the client to the server or the server to the client. The process considers an electronic mail message as having two components: 1) the message header and 2) the message body. Message headers typically include, for example, information identifying the mail address of the message sender, the mail addresses of the message recipients, the subject of the message, the date and time of transfer and a unique message identifier (Message-ID). The message body typically includes a text message produced by the message sender. Although considered as part of the message body for the purposes of this description, mail message attachments may alternatively be treated as a third message component.

For server to client transfers, reference object selection is based both on header similarity and body similarity. Since message headers in client to server transfers tend to be very small, reference object selection for client to server transfers may be based on body similarity alone.

Returning to FIG. 5, the selection process begins with a series of inputs in step 501. Included in the series of inputs are identifier u, the current set of cached message headers ($C_H$), the current set of cached message bodies ($C_B$), and the current total size of the cached reference objects (n). In step 505, the set of selected reference objects is initialized as a null set.

In step 507 of FIG. 5, the process determines whether the size of S is less than the minimum of a maximum size n for all cached reference objects and the size $|C_H|+|C_B|$ of the set of all cached header and text body objects. If S is less than this minimum, the process continues in step 509 to identify a next header in $C_H$ that has maximum similarity with message u, and adds the identified header to S in step 510. Similarly, in step 511, the process identifies a next body in $C_B$ that has maximum similarity with message u, and adds the identified body to S in step 512.

This process continues until the size of S is determined to be greater than or equal to the minimum of the n and $|C_H|+|C_B|$ in step 507, at which point the reference objects comprised in S are saved in step 513 and the process is exited in step 515. Maximum size n may be selected to be sufficiently small to ensure completion of the process in cases where $|S|$ may not readily reach the size $|C_H|+|C_B|$.

As noted earlier, the process of FIG. 5 employs heuristics to determine the respective similarities of the header and body of message u to cached message headers in $C_H$-S and cached message bodies in $C_B$-S. For message headers, comparison is first made on the basis of information identifying the message sender for u and for unselected cached message headers $C_H$-S. If more than one of the cached message headers in $C_H$-S exhibit maximum similarity to the sender associated with message u, the process next determines similarity as a function of message subject. If more than one of the cached message headers $C_H$-S exhibit maximum similarity to the subject associated with message u, the process finally determines similarity as a function of message date and time.

For message bodies, the heuristics are employed in a different order. The process begins by determining similarity of message subjects for message u and for unselected cached message bodies in $C_B$-S. If more than one of the cached message bodies in $C_H$-S exhibit maximum similarity to the subject associated with message u, the process next determines similarity as a function of message sender. If more than one of the cached message bodies $C_H$-S then exhibit maximum similarity to the sender associated with message u, the process finally determines similarity as a function of message date and time. Although the heuristics described are selected based on our experience and experimentation, one skilled in the art may readily envision alternate heuristic sequences that are contemplated by and consistent with our invention.

Figure 7A:
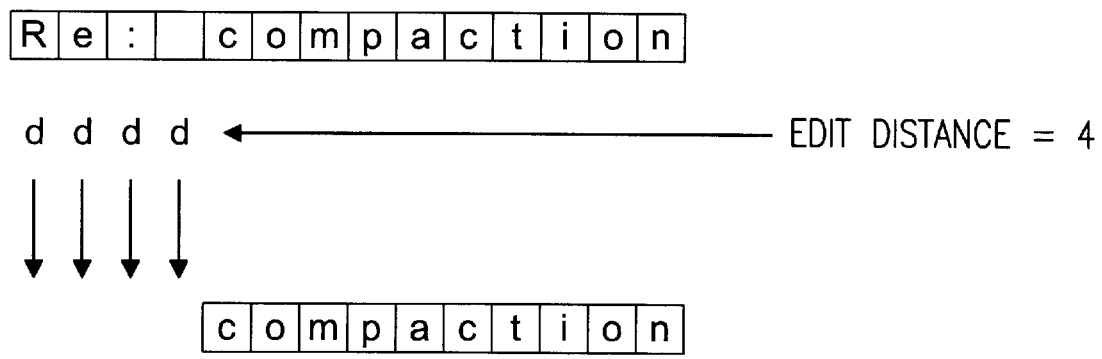
FIGS. 7A and 7B illustrate how edit distance is calculated as a similarity metric for use in the process of FIG. 5.
Figure 7B:
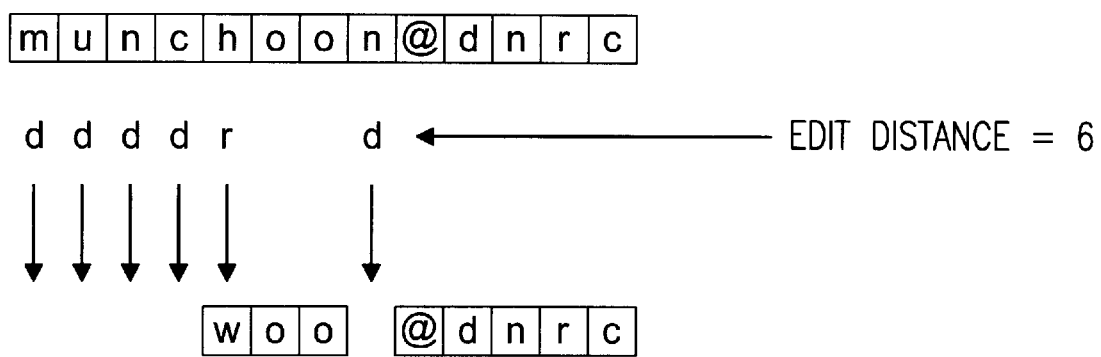

In the process of FIG. 5, similarity between two text strings may be directly measured as a function of "edit distance" between the two text strings. We define the edit distance between two text strings as the minimum number of copy, replace, delete and insert operations required to transform a first of the two strings into the second string. FIGS. 7A and 7B illustrate how edit distance may be computed for two example text string pairs.

Consider the two text strings "Re: compaction" and "compaction" illustrated in FIG. 7A. A first string "Re: compaction" may be transformed into a second string "compaction" by deleting the first four characters in the first string ("R", "e", ":" and <space>). In FIG. 7A, each deletion is denoted by the symbol (d). Accordingly, edit distance between the first and second strings is indicated as the sum of the number of character deletions, or 4. Note that the same edit distance may be alternatively computed by transforming the second string into the first string by adding the four characters "R", "e", ":" and <space>.

A second example is presented in FIG. 7B. Here, a first string "munchoon@dnrc" is transformed into a second string "woo@dnrc" by deleting the first four characters of the first string, replacing the fifth character of the first string (with "w"), and deleting the eighth character of the first string. In FIG. 7B, the character replacement is denoted by the symbol (r). Accordingly, edit distance between the two strings is indicated as the sum of the number of character deletions and changes, or 6. Again, the same edit distance may be alternatively computed by determining the minimum number of copy, replace, delete and insert operations required to transform the second string into the first string.

Referring now to FIG. 6, there is shown a diagram illustrating the decoding process performed in step 215 of FIG. 2A. The decoding process is the reverse of the encoding process described above in conjunction with FIG. 4. The process begins in step 601, in which the encoded version O' of object O, and the list of reference objects $\{O_1 \ldots O_m\}$ are read. Recall that these reference objects were used when O was encoded as O'. Next, in step 603, O is initialized to a null string.

Next, the value of O' is examined in step 605 to determine if it is a null string, indicating that processing has been completed. If the result in step 605 is "no", the process proceeds to steps 609, 611 and 613. Here, for each token contained in O', the token is checked in step 611 to see if it is a character token or a triple token. For a character token, the result in step 611 is "yes", and the character is appended to O in step 615. For a triplet token $\{k, pos, l\}$, the string starting at position pos of object $O_k$ with length l, is appended to the O in step 613. When all the tokens have been processed, the result in step 605 is "yes". At that point, the value of O is written in step 607, and the process terminated in step 617.

The advantages of the compaction technique of the present invention were verified experimentally. We performed two sets of experiments, the first set for server-to-client transfer and the second set for client-to-server transfer. In both cases, given a set of chronologically ordered electronic mail messages, the experiments were designed to retrieve electronic mail messages beginning with the sixty-fifth chronological message, using the previous sixty-four electronic mail messages as possible reference objects stored in the appropriate cache. Electronic mail messages larger than sixty-four kilobytes were ignored and not considered as possible reference objects. Also, the maximum length of the subject and sender strings used for message selection was limited to thirty-two bytes.

In the encoding stage, all cached reference objects were concatenated into a single reference object ($O_1$) before encoding. As email messages are usually relatively short, this approach was found to reduce encoding overhead. As an additional strategy for reducing overhead, only the first n bytes of $O_1$ were used for encoding (for the two sets of experiments, n was set to be sixty-four kilobytes).

In the two sets of experiments, we measured the reduction in size of messages transferred as a compression ratio $R_c$:

$$R_c = S_c/S_u, \quad (1)$$

where $S_c$ is the size of the encoded message in bytes, and $S_u$ is the size of the unencoded message in bytes.

For server-to-client transfer, we measured $R_c$ for five clients. Each client had a total number of messages ranging from 174 to 879. On average for each client, $R_c$ ranged from about 0.31 to 0.36. We also ran the same experiment using another commercially available compression utility (gzip), and found that our compaction technique on average produced $R_c$ values about 30 percent lower than those produced using gzip. Our experiment demonstrated that somewhat better results may be achieved when electronic mail messages to be compacted are small (less than about 16 kilobytes).

Our results for client-to-server transfer were similar. For a user composing and sending 50 electronic mail messages which on average are about 1300 bytes in length, we produced $R_c$ values of about 0.44 (again about 30 percent lower than results obtained using gzip). $R_c$ values for client-to-server transfers were somewhat higher than for server-to-client transfers, as message headers for client-to-server transfers tend to be far less redundant.

Our idea of cache-based compaction is based on a simple observation: A dictionary-based compression scheme works better if the available dictionary is bigger. Thus by leveraging the objects that are already in a client's cache as the "extended" working dictionary, the transfer of an object can be further optimized compared to having only the object itself as the working dictionary. Obviously, the extended dictionary is useful only if it includes common "vocabularies" or substrings as the requested object.

Another useful contribution of the present invention is that it nicely ties together compression, caching and prefetching. It relates compression and caching by providing a way to leverage the cached objects to improve compression. For prefetching, one can potentially use the idea of compaction to hedge against prefetching the "wrong" objects by prefetching instead a set of objects that are most likely to be "similar" to the objects that will be needed in the future. This relaxes the selection criteria for prefetching and significantly alleviates the penalty of incorrect prefetching.

The exemplary embodiments described above are but a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a worker skilled in the art without departing from the teachings of this invention. For example, in addition to the described electronic mail message applications, the present invention may be used to improve information transfer over slow access links for other client/server applications such as electronic commerce applications and other large database retrieval applications.

We claim:

1. A process for retrieving an electronic mail message from an electronic mail server by a client having a client cache, the process comprising the steps of:

selecting one or more objects in said client cache having similarities with respect to said electronic mail message;

transmitting a request from the client to the server identifying said electronic mail message and the one or more selected similar objects in said client cache;

receiving an encoded object in the client together with identifiers identifying one or more of the one or more selected similar objects; and decoding in the client the encoded object into the requested message by using the one or more identified similar objects.

2. The process of claim 1, further comprising the steps of:

receiving the transmitted request in the server identifying said electronic mail message and the one or more selected similar objects in said client cache;

obtaining said electronic mail message in the server;

forming an encoded version of said electronic mail message in the server using one or more encoding objects substantially identical to ones of the one or more selected similar objects in said client cache; and transmitting the encoded version to the client together with the identities of the encoding objects.

3. The process of claim 1, wherein object similarity is determined as a function of edit distance between a selected object and said electronic mail message, edit distance being defined as the fewest number of character operations required to transform the object into said electronic mail message.

4. The process of claim 3, wherein the character operations are selected from the set consisting of copy, replace, delete and insert operations.

5. The process of claim 3, wherein edit distance is determined with reference to a predetermined component of the selected object and the electronic mail message.

6. The process of claim 5, wherein the predetermined component is selected from the set consisting of message sender, message subject and message date.

7. The process of claim 6, wherein objects are selected from the set consisting of header objects and text body objects.

8. The process of claim 7, wherein objects are incrementally selected from said client cache, each incrementally selected object having an edit distance value least among edit distance values for each unselected object in said client cache.

9. The process of claim 8, wherein header objects are selected by determining the least edit distance value with respect to the message sender component.

10. The process of claim 9, wherein when each of a first plurality of header objects has the least edit distance value with respect to the message sender component, determining least edit distance for each of the first plurality of header objects with respect the message subject component.

11. The process of claim 10, wherein when each of a second plurality of header objects has the least edit distance value with respect to the message subject component, determining least edit distance for each of the second plurality of header objects with respect the message date component.

12. The process of claim 8, wherein text body objects are selected by determining the least edit distance value with respect to the message subject component.

13. The process of claim 12, wherein when each of a first plurality of text body objects has the least edit distance value with respect to the message subject component, determining least edit distance for each of the first plurality of text body objects with respect the message sender component.

14. The process of claim 13, wherein when each of a second plurality of text body objects has the least edit distance value with respect to the message sender component, determining least edit distance for each of the second plurality of text body objects with respect the message date component.

15. The process of claim 1, wherein the one or more selected similar objects in said client cache are locked until completion of the decoding step.

16. The process of claim 2, wherein the forming step includes differential encoding and the decoding step includes differential decoding.

17. The process of claim 8, wherein objects are incrementally selected so long as the sum of character string lengths for each of the incrementally selected objects does not exceed a predetermined threshold.

18. The process of claim 17, wherein the predetermined threshold is equivalent to approximately 64 kilobytes of binary character representations.

19. The process of claim 17, wherein the predetermined threshold is equivalent to the sum of the character string lengths for each of the objects in the client cache.

20. A process for transferring an electronic mail message from a client having a client cache to an electronic mail server, the process comprising the steps of:

selecting one or more objects in said client cache that are similar to said electronic mail message;

forming an encoded version of said electronic mail message in the client using ones of the one or more selected similar objects; and transmitting the encoded version to the server together with information identifying the one or more encoding objects.

21. The process of claim 20, further comprising the step of decoding the encoded version in the server by using one or more decoding objects each substantially identical to a corresponding one of the one or more encoding objects.

22. The process of claim 21, further comprising the steps of:

transmitting after the selecting step the identities of the one or more selected similar objects to the server; and receiving prior to the forming step a message from the server identifying one or more decoding objects, the decoding objects being substantially identical to ones of the one or more selected similar objects;

so that the encoded version of said electronic mail message portion in the client may be formed using ones of the one or more selected similar objects that correspond to the identified decoding objects.

23. The process of claim 20, wherein object similarity is determined as a function of edit distance between a selected object and electronic mail message, edit distance being defined as the fewest number of character operations required to transform the object into said electronic mail message.

24. The process of claim 23, wherein the character operations are selected from the set consisting of copy, replace, delete and insert operations.

25. The process of claim 23, wherein the object components are selected from the set consisting of message sender, message subject and message date.

26. The process of claim 23, wherein objects are selected from the set consisting of header objects and text body objects.

27. The process of claim 23, wherein objects are incrementally selected from said client cache, each incrementally selected object having an edit distance value least among edit distance values for unselected objects in said client cache.

28. A process for transferring an electronic mail message in a client/server mail application, wherein one of the client and server is the message sender and the other is the message recipient, the process comprising the steps of:

forming an encoded version of the electronic mail message by the message sender using one or more encoding objects, each one of said one or more encoding objects being selected from a sender cache and sharing similarities with the electronic mail message; and transmitting the encoded version and the identities of the one or more selected similar objects to the message recipient.

29. The process of claim 28, further including the step of decoding the encoded version by the recipient into the electronic mail message by using the one or more identified encoding objects.

30. The process of claim 28, wherein object similarity is determined as a function of edit distance between a predetermined component of an encoding object and the electronic mail message, edit distance being defined as the fewest number of character operations required to transform the object into said electronic mail message.

* * * * *